United States Patent [19]

Haraikawa et al.

[11] 4,343,381
[45] Aug. 10, 1982

[54] DISC BRAKE FRICTION PAD RETAINING MEANS AND GUIDE SEAL

[75] Inventors: Tetsuo Haraikawa, Funabashi; Koichi Tamura, Tokyo, both of Japan

[73] Assignee: Tokico Ltd., Kawasaki, Japan

[21] Appl. No.: 159,926

[22] Filed: Jun. 16, 1980

[30] Foreign Application Priority Data

Jun. 25, 1979 [JP]  Japan ............................ 54-87076[U]

[51] Int. Cl.³ ............................................. F16D 65/14
[52] U.S. Cl. ................................. 188/73.45; 188/71.1; 188/73.39
[58] Field of Search ................... 188/71.1, 72.4, 72.5, 188/73.3, 73.4, 73.6, 73.39, 73.44, 73.45

[56] References Cited

U.S. PATENT DOCUMENTS 4,022,303  5/1977  Kondo .......................... 188/736 X

FOREIGN PATENT DOCUMENTS 2724436 12/1977  Fed. Rep. of Germany ..... 188/73.3
1524387  9/1978  United Kingdom ............... 188/71.1

*Primary Examiner*—George E. A. Halvosa
*Attorney, Agent, or Firm*—Wenderoth, Lind & Ponack

[57] ABSTRACT

A disk brake comprising a stationary member secured to a non-rotatable part of a vehicle, a caliper supported on the stationary member through a pin to displace toward and away from a rotatable disc, a friction pad supported on a stepped portion formed on the stationary member to displace toward and away from the rotatable disc, a piston provided in the caliper to act on the friction pad, and a guide bore formed in the stationary member to slidably receive therein the pin secured to the caliper. A dust boot is provided to cover and protect the gap between the pin and the guide bore, and one end of the dust boot secured to the stationary member has a projection projecting toward the stepped portion, thereby restricting the displacement of the friction pad separating from the disc.

3 Claims, 5 Drawing Figures

DISC BRAKE FRICTION PAD RETAINING MEANS AND GUIDE SEAL

BACKGROUND OF THE INVENTION

The present invention relates to improvements in disc brakes of the kind including a stationary member adapted to be secured to a non-rotatable part of a vehicle, a caliper member supported on the stationary member so as to move toward and away from a rotatable disc, and a pin and guide bore device provided between the two members to guide the movement of the caliper member with respect to the stationary member.

The disc brakes of the aforementioned kind further include a pair of friction pads disposed on opposite sides of the rotatable disc, and an actuator such as a hydraulic piston and cylinder device, incorporated in the caliper member to directly act on one friction pad or a friction pad on the piston side, thereby pressing the same against one surface of the disc. The other friction pad is applied against the other surface of the disc by the reaction force generated in the actuator.

The one friction pad, such as the friction pad on the piston side, is usually supported on the stationary member to move toward and away from the disc, while the other friction pad may also be mounted on the stationary member or may be mounted on the caliper member. For mounting the friction pad on the stationary member, a pair of opposing and circumferentially projecting lugs is formed on the friction pad, and the lugs are slidably supported on axially extending and circumferentially spaced stepped portions formed on the stationary member. The pin and guide bore device usually comprises a pair of circumferentially spaced parallel guide bores formed in the stationary member and slidably receiving therein pins which are secured to the caliper.

Disc brakes having such a construction generally operate satisfactorily. However, there are shortcomings such that the friction pad on the side of the piston and supported on the stepped portions of the stationary member sometimes moves off the stepped portion of the stationary member in the direction away from the surface of the disc when the piston or the caliper has accidentally been displaced beyond the normal operating range, whereby the friction pad may drop out of the disc brake.

SUMMARY OF THE INVENTION

The present invention provides a disc brake overcoming the above described shortcomings with a simple construction. The disc brake comprises a dust boot covering a portion of the pin projecting out of the guide bore with one end thereof being mounted on the stationary member, and an projection formed on the one end of the dust boot to project transversely to the axis of the pin and towards the stepped portion having the friction pad slidable thereon so as to restrict the movement of the friction pad in the direction away from the disc.

BRIEF DESCRIPTION OF THE DRAWINGS

The invention will be further explained with reference to the accompanying drawings exemplifying a preferred embodiment of the invention, and in which.

DETAILED EXPLANATION OF THE PREFERRED EMBODIMENT

Figure 1:
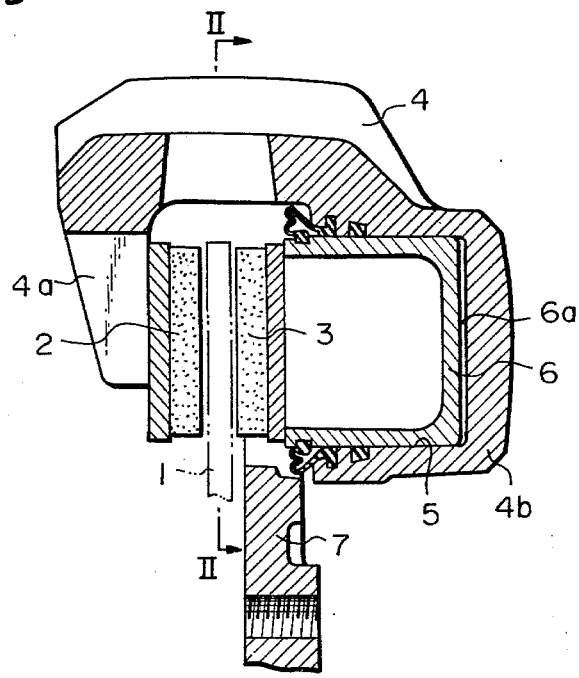
FIG. 1 is a longitudinal sectional view of a disc brake according to the invention.
Figure 2:
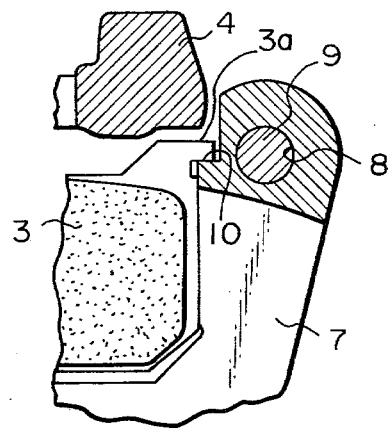
FIG. 2 is a partial sectional view taken along line II—II in FIG. 1.

The disc brake shown in the drawings comprises a stationary member 7 adapted to be secured to a non-rotatable part of a vehicle not shown in the drawings, a caliper member 4 supported on the stationary member 7 to move toward and away from a rotatable disc 1, and a pair of friction pads 2 and 3 disposed on the opposite sides of the disc 1. A cylinder 5 slidably receiving therein a piston 6 is formed in one limb portion 4b of the caliper member 4, and the piston 6 acts on the friction pad 3 when pressurized oil is supplied into a space 6a defined at the rear surface of the piston 6. Another limb portion 4a of the caliper member 4 straddles a portion of the circumference of the disc 1 so as to extend to the rear side of the friction pad 2.

The movement of the caliper member 4 with respect to the stationary member 7 is guided by a pair of circumferentially (in the direction of the circumference of the disc 1) spaced pin and guide bore devices. Each pin and guide bore device (only one is shown in the drawings) comprises a guide bore 8 formed in the stationary member 7 and a pin 9 secured to the caliper member 4 by a pin bolt 11. There is provided a dust boot 12 to cover and protect a portion of the pin 9 projecting out of the bore 8 or the gap between the pin and guide bore. One end 13 of the dust boot 12 is fitted in an annular groove formed around the open end portion 7a of the bore 8, and the other end of the dust boot 12 is secured to the outer end portion of the pin 9.

In the embodiment shown in the drawings, the stationary member 7 has a pair of circumferentially spaced and axially extending arm portions (only one is shown in the drawings) which straddle respectively the circumference of the disc. An axially extending and radially outwardly facing shoulder 10 acting as a stepped portion according to the invention is provided on each arm portion of the stationary member 7 to slidably receive thereon circumferentially extending lugs (denoted typically as 3a in FIG. 3) on the friction pads 2 and 3. The friction pads 2 and 3 approach one another when the brake is applied and separate when the brake applying force is released. When the wear of the friction pads 2 and 3 increases, the caliper member 4 is displaced rightward as viewed in FIG. 1 with respect to the stationary member 7 and the amount of the piston 6 projecting out of the cylinder 5 increases. Therefore, the clearance between the near side of the shoulder 10 as viewed in FIG. 3 and the limb portion 4b of the caliper member 4 increases. Thus, the friction pad 3 in the prior art disc brake may accidentally move off the shoulder 10 and into the clearance between the stationary member 7 and the limb portion 4a of the caliper member 4, thereby falling out of the disc brake.

Figure 3:
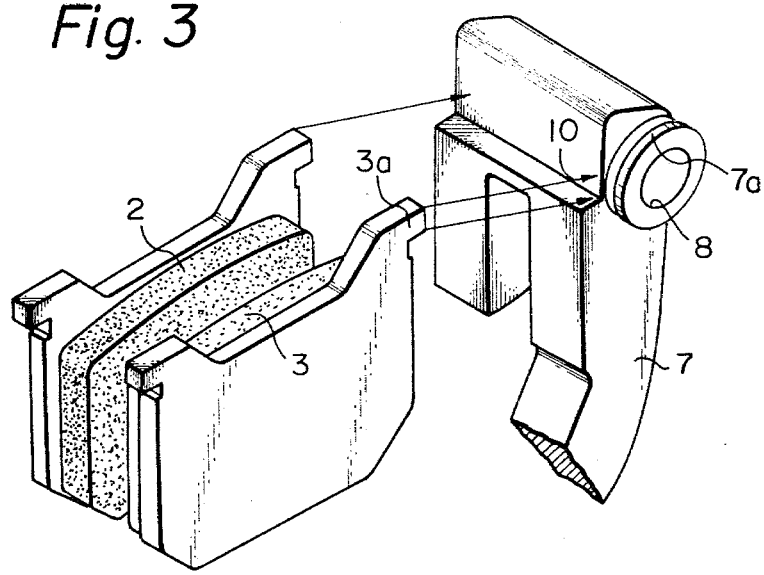
FIG. 3 is a perspective view showing the relationship between the friction pads and the stationary member in the disc brake of FIG. 1.
Figure 5:
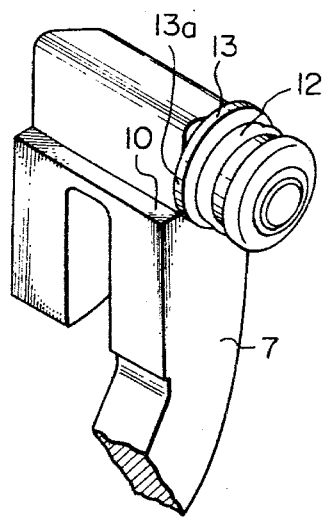
FIG. 5 is a partial perspective view showing the stationary member with the dust boot fitted thereon.
Figure 4:
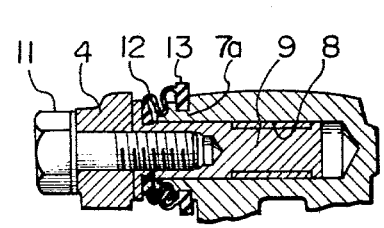
FIG. 4 is a partial sectional view of the pin and guide bore device in the disc brake of FIG. 1.

According to the invention, the end portion 13 of the dust boot 12, which is secured to the stationary member 7, is given an increased diameter so that at least a portion 13a of the end portion 13 projects into the path of the movement of the friction pad 3, thereby restricting the movement of the friction pad 3 in the direction away from the disc or in the direction toward the viewer in FIG. 3.

In the embodiment, the end portion 13 is annular to define the projecting portion 13a. However, the projecting portion 13a may be defined by a projection projecting only toward the shoulder 10.

The friction pad 2 is supported on the shoulders of the stationary member in this embodiment. However, the friction pad 2 may be secured to the limb portion 4a of the caliper member 4. Further, the lugs formed on the friction pads in this embodiment are supported on a pair of circumferentially spaced, axially extending, and radially outwardly facing shoulders of the stationary member, but the shoulder and lug engagement between the friction pad and the stationary member may be modified so as to be an axially extending groove and lug engagement wherein the grooves may be formed in the stationary member or in the friction pad to slidably receive therein the lugs which may be formed on the circumferentially opposite sides of the friction pads or on the circumferentially opposing side surfaces of the stationary member.

According to the invention the accidental displacement of the friction pad out of the disc brake can reliably be prevented by a simple construction, thereby eliminating the troublesome operations which are required when the friction pad has accidentally displaced out of the disc brake.

What is claimed is:

1. A disc brake comprising: a stationary member secured to a non-rotatable part of a vehicle and having a stepped portion, a caliper member supported on the stationary member for movement toward and away from a rotatable disc, at least one friction pad supported on the stepped portion of the stationary member for movement toward and away from the disc, a piston provided in the caliper member and acting on said one friction pad for moving it toward the rotatable disc, a pin and guide bore means provided between the caliper member and the stationary member for guiding the caliper member during movement thereof with respect to the stationary member, said means having a pin with a portion projecting from a guide bore, a dust boot covering the portion of the pin projection out of the guide bore, one end of the dust boot being integral with an intermediate portion of a flange secured to the stationary member said flange having a further integral portion radially extending from said intermediate portion and functionally separate from the remainder of said boot and extending towards the stepped portion sufficiently far to extend into the path of movement of said friction pad along said stepped portion and having a rigidity sufficient for preventing said one friction pad from being displaced off said stepped portion.

2. A disc brake as claimed in claim 1 wherein the guide bore is in the stationary member and the pin is secured to the caliper member, and said stationary member has an annular groove therein around the open end of the guide bore, and said flange being an annular flange held in said annular groove for being secured to said stationary member.

3. A disc brake as claimed in claim 2 wherein said stepped portion comprises circumferentially spaced, axially extending and radially outwardly facing shoulders on the stationary member, and said friction pad has lugs on the circumferentially opposite ends thereof.

* * * * *